United States Patent [19]

Mossbach

[11] Patent Number: 4,662,350

[45] Date of Patent: May 5, 1987

[54] HEATING APPARATUS FOR A WATER HEATING FOR SMALL ROOMS

[76] Inventor: Wilhelm Mossbach, Rothuchenstrasse 37, D-8011 Kirchseeon, Fed. Rep. of Germany

[21] Appl. No.: 877,693

[22] Filed: Jun. 19, 1986

Related U.S. Application Data

[63] Continuation of Ser. No. 724,269, May 7, 1985, abandoned.

[30] Foreign Application Priority Data

Apr. 10, 1984 [DE] Fed. Rep. of Germany ....... 8410398

[51] Int. Cl.⁴ .................................................. F24D 9/00
[52] U.S. Cl. ..................................... 126/101; 126/365; 126/132; 126/133; 122/20 B; 122/44 A; 122/155 A
[58] Field of Search ................... 126/133, 132, 34, 53, 126/54, 364, 365, 101; 237/56, 59; 122/20 A, 20 B, 44 A, 44 B, 155 A, 155 C

[56] References Cited

U.S. PATENT DOCUMENTS

| | | | |
|---|---|---|---|
| 544,152 | 8/1895 | Benjumea | 122/155 A |
| 659,460 | 10/1900 | Tilden | 126/101 |
| 1,426,642 | 8/1972 | Hitchen | 126/101 |
| 1,919,576 | 7/1933 | Schroeder | 126/132 |
| 1,959,558 | 5/1934 | Van Daam | 126/133 X |
| 2,067,133 | 1/1937 | Wales | 122/155 A |
| 2,190,998 | 2/1940 | Somers | 126/101 |
| 2,379,155 | 6/1945 | Huff | 122/155 A |
| 2,533,508 | 12/1950 | Riu | 126/101 |
| 4,050,626 | 9/1977 | Awalt, Jr. | 126/132 X |
| 4,126,118 | 11/1978 | Haynes | 126/132 X |
| 4,143,638 | 3/1979 | Kamstra et al. | 126/121 |
| 4,271,816 | 6/1981 | Carocci | 126/133 X |
| 4,396,003 | 8/1983 | Mollard | 126/132 X |
| 4,436,079 | 3/1984 | Piazzetta | 126/132 X |

FOREIGN PATENT DOCUMENTS

| | | | |
|---|---|---|---|
| 3020360 | 11/1981 | Fed. Rep. of Germany | 126/132 |
| 2270532 | 12/1975 | France | 126/132 |
| 642156 | 3/1984 | Switzerland | 126/132 |

Primary Examiner—Randall L. Green
Attorney, Agent, or Firm—Alfred E. Miller

[57] ABSTRACT

A hot water heater for trailers or mobile homes and the like, wherein increased heat capacity is provided due to exposure to combustion gases over large heating surfaces and including the use of heating fans whereby the heated water is conducted to radiators with the maximum heating temperature. The arrangement also provides for an additional supply of hot air in the area to be heated thereby eliminating the cold zone in the center of the room.

4 Claims, 5 Drawing Figures

HEATING APPARATUS FOR A WATER HEATING FOR SMALL ROOMS

This application is a continuation of application Ser. No. 724,269, filed 5/7/85, abandoned.

The invention relates to a heater for a water heating installation for small rooms, particularly mobile rooms, such as trailers, mobile homes, ship's cabins or the like.

In a hot water heater for trailers or traveling rooms of that kind known in practice, a helically ascending heating coil for the heating water is soldered to the outside of a combustion chamber of circular cross-section. The flow and return pipes to the radiators are connected to this heating coil. Since the heating coil and the flow and return pipes are essentially identical, the heating coil is also traversed at the velocity of the heating water transport to the radiators, as a result of which, in the case of a high heat requirement, the heating time is frequently not sufficient for an adequate heat uptake. The heating surface in contact with the combustion gases are also relatively small, so that the heating capacity also leaves something to be desired. In addition, the construction is costly and expensive. An additional disadvantage in the known hot water heating installations is the fact that the room air that heats up at the radiators rises along the room walls and, in the central room region, drops downward in a cooled state, as a result of which, in the center of the room, at the bottom near the floor, the room temperature is usually much too low. The known hot water heating installations are not suitable for providing a remedy.

The invention is therefore based on the task of proposing a heater for a hot water heating installation which, with a particularly simple design, is characterized by increased heating capacity, which is also sufficient for the connection of a service water supply unit, and which is suitable for being expanded in a simple manner to a hot air heating installation.

This task is solved in a heater constructed according to the teachings of the present invention.

Through the design of a heating water jacket relative to an ascending shaft of the combustion chamber, which forms at least one circulation channel, a relatively large quantity of heating water is exposed to the combustion gases over large heating surfaces, particularly if the inner wall of the heating water jacket is corrugated, and a rapid heating of this quantity of heating water is thereby achieved. The transverse heating fins preferably located in the upper region of the ascending shaft, which can also be water-conducting, increase the heat transfer to the heating water, during which heat is also removed from the combustion gases rising in the center of the ascending shaft. Since the receiving volume and the flow cross-section of this heating water jacket are significantly larger than in the case of the heating pipes, the residence time of the heating water in the heating water jacket is also increased, so that the heating water can always be conducted to the radiators with the maximum heating temperature, even in the case of a large heat requirement. The heating water jacket according to the invention can be designed in both circular, square, and oblong-rectangular cross-sectional form. Through its construction it is suitable in a particularly simple and favorable manner for the application of a heating air jacket, through which hot air can additionally be supplied to the room, thereby eliminating the cold zone in the center of the room.

The invention is described in greater detail below with reference to an embodiment, which is also represented in schematic form in the drawing, in which:

DESCRIPTION OF THE INVENTION

Figure 1:
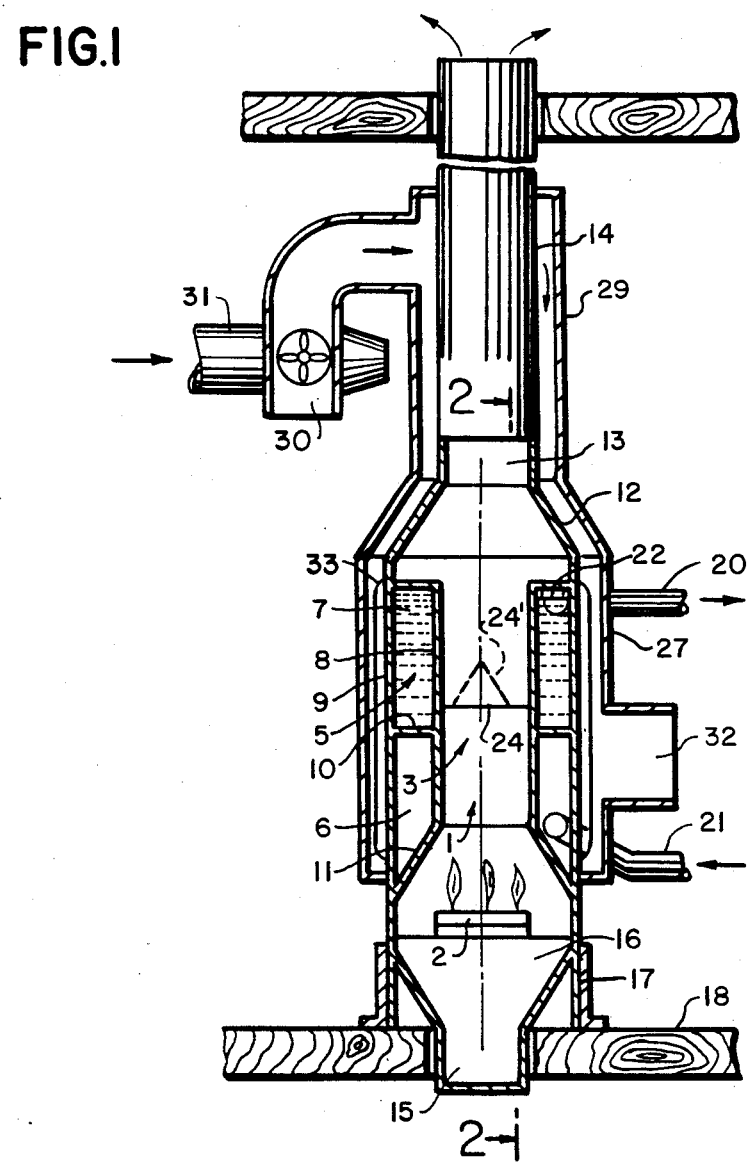
FIG. 1 shows a vertical section through a heater adapted for use with a service water supply unit connected to it.

In the heater shown, the combustion chamber 1, in which is located a set of burners 2, is formed by an ascending shaft 3, which is enclosed by a heat exchanger in the form of a double-walled heating water jacket 5. In the embodiment according to FIG. 1, this contains circulation channels 6 and 7, arranged one above the other in a stagewise manner. This heating water jacket suitably consists of an inner wall 8 and an outer wall 9 offset from this, with the space between these being subdivided by a number of horizontal partitions 10 corresponding to the number of stage circulation channels. The circulation channels, in a vertical section, are rectangular as seen on edge and only the bottom wall 11 leading in the direction of the burner set slopes upwardly toward the inside in order to increase the heating surfaces, to prevent flame impingement walls, and to bring together the combustion gases rising from the burner set. The heating water jacket is closed at the top by a fitted collecting hood 12, which changes to a circular pipe connection 13 for the mounting of a waste gas pipe 14. This waste gas pipe is installed, for example, through the roof. The fresh air for the gas combustion enters at the bottom through a bottom opening 15 and is distributed over the cross-section of the combustion chamber through an extension section 16. The gas line to the burner set is not shown in the drawing. The heater is fastened to the floor 18 by means of supports 17.

Figure 3:
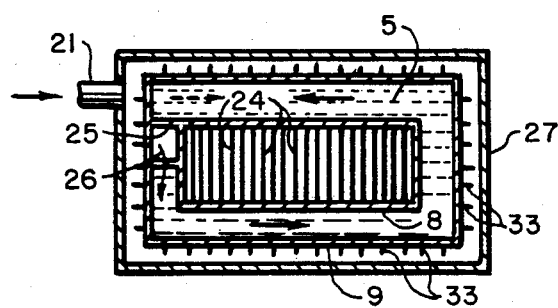
FIG. 3 shows a cross-section along the line III—III of FIG. 2.
Figure 4:
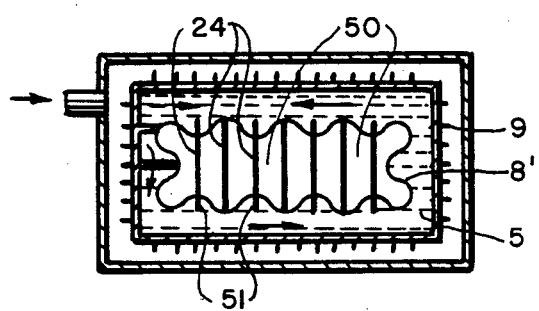
FIG. 4 shows a cross-section similar to FIG. 3 through a modified heating water jacket.

From the upper circulation channel 7, the heated heating water enters into a flow pipe 20, in order to supply the connected radiators (not shown in the drawing) with a heat transfer medium. This medium is returned through a return pipe 21 to the lower circulation channel 6. In order to prevent the formation of a steam or water stagnation space before the flow pipe 20 in the upper circulation channel, the circulation channel cover 22 rises slightly in the direction of the flow pipe connection. In the ascending shaft, suitably in the region of the upper circulation channel 7, the inner walls 8 are connected to each other by means of parallel heating fins 24, consisting of a material with good thermal conductivity. By means of these erect heating fins, the ascending combustion gases are fanned out in the ascending shaft and, in this way, the center of this gas stream is also used for heat transfer. In the case of an oblong-rectangular cross-section of the ascending shaft, the heating fins are suitably arranged between the long inner walls 8, as shown in FIGS. 3 and 4. These heating fins can be solid bodies, as drawn, or can also be hollow bodies, for flow-through of the heating water. In the latter case, the cross-sections of the heating fins will be signficantly larger and the number of fins will therefore also be smaller. In order to prevent the heating water in the heating water jacket from being excessively heated in the lower region of the heating fins, and thereby being brought to boiling, some or all heating fins, particularly if solid-body fins are involved, may be cut out toward the center of the lower region, so that the lower edge 24' (FIG. 1, broken line) of these heating fins rises in a triangular or curved manner and the heating surfaces in the lower region of the heating fins are thereby noticeably decreased. The circulation channels are connected with each other in such a way that the circulation flow in the upper circulation channel in each case proceeds in the opposite direction from that in the lower channel. If, therefore, the return water enters the lower circulation channel 6 through the return pipe 21, then an end plate 25 forces the entering water to circulate in the direction of the broken arrow until it is deflected at the end of this circulation channel, on the other side of this end plate 25, ascends through a partition opening 26 into the upper circulation channel 7, and flows in the direction of the solid arrows through this upper circulation channel up to the flow pipe 20.

While the heating water jacket 5 has a planar inner wall 8 in FIG. 3, the inner wall 8' in the embodiment according to FIG. 4 is corrugated, in order to increase the heating surface in this way. By means of vertical corrugations, shaft flues 50 are also formed, which promote the flow of the combustion gases along these corrugations, but, on the other hand, the water flowing transversely to the corrugations is made turbulent and mixed. It can also be seen from FIG. 4 that some of the heating fins 24 pass through the inner wall 8' with their ends 51 and end in the heating water jacket.

The heater shown is surrounded at a distance by a heating air jacket 27 in the region of the heating water jacket. This heating air jacket, in the embodiment, also extends as a chimney jacket 29 about the waste gas pipe 14, so that the heat of the waste gases is also utilized. By means of a blower 30 located above the heater, the room air to be heated is drawn in through an air inlet 31 and is forced downwardly through the air jacket 29, 27. From the exit opening 32, the heated air then flows into the room, and at as low a location as possible, in order to also increase the air temperature in the center of the room directly above the floor. Vertical fins 33, which significantly improve the heat transfer to the air stream, are advantageously developed on the surface of the outer wall 9 of the heating water jacket. It has been found that the capacity of the heater is sufficient to be able to remove heat from the heating water for heating the heating air. In addition, the heat transfer to the heating air largely prevents an excessive heating of the heating water, resulting in stream formation. The production of heated air also makes possible a certain regulation and stabilization of the heating water temperature.

Figure 1A:
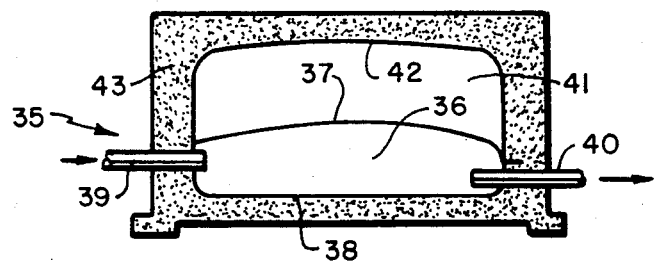
FIG. 1A is a sectional view of a service water supply unit.
Figure 2:
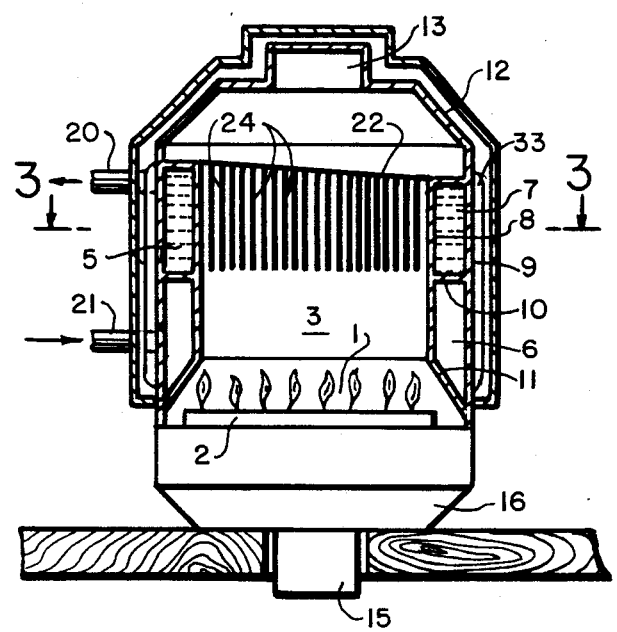
FIG. 2 shows a vertical section through the actual heater along the line II—II of FIG. 1, slightly enlarged.

The favorable heating water preparation of this heater makes possible the additional insertion of a service water supply unit 35, as seen in FIG. 1A which is connected to branch lines of the flow and return pipes 20, 21 of the heater. The service water supply unit consists of an approximately lenticular panel heater 36 made of two shells 37, 38, as identical in shape as possible, with an approximately rectilinear flow of the heating water with a feed pipe 39 and a drain pipe 40. A service water boiler 41, suitably with an also curved cover 42, is placed on the panel heater. The complete service water supply unit is sheathed in a thermal insulation 43. The service water feed and drain connections are not shown in the drawing. The service water supply unit, which is assembled from only three formed parts and is therefore very simple, shows a relatively large heating surface, which ensures an adequate heating of the service water. Through the capacity of the panel heater 36, the amount of heating water and thus also the heat storage is increased.

The invention is not restricted to the embodiment with the two circulation channels of the heating water jacket as shown, because, with a somewhat higher ascending shaft, three or more circulation channels can also be accommodated without having to give up the relatively high channels with the large heating surfaces. Through the incorporation of baffle plates, it is also possible to design the heating water jacket with only one circulation channel, so that the heating water, in this case as well, flows around the ascending shaft to its full extent as far as possible. Vertical baffle plates can further extend the flow path in the individual channels even when several circulation channels are present.

The heating fins, which proceed in the same direction in the embodiment, can also be supplemented by additional fins proceeding in another direction, e.g., in a crosswise arrangement. The heating fins in a heater can also be of different lengths. For example, individual fins can project further downward into the combustion chamber, in order to produce a preliminary distribution of the combustion gas stream. The circulation channels can also be composed of independent components, which are then assembled into a heating water jacket.

I claim:

1. In a heater for a water heating installation for small rooms, such as trailers and mobile homes having a vertically disposed combustion chamber, part of which is an ascending shaft, a plurality of burners located below said combustion chamber for gaseous or gasified liquid fuels, an exhaust gas chimney connected to said ascending shaft for discharge of said combustion gases, the improvement comprising a heating water jacket, flow and return pipes connected to said heating water jacket for the supply of radiators, or the like, with heating water, said heating water jacket being circumferentially arranged about said ascending shaft such that said ascending shaft forms a wall of said heating water jacket, said heating water jacket having at least one substantially horizontally disposed partition forming a plurality of circulation channels arranged in a superposed manner and wherein, a pair of lower channels of said circulation channels are in space confronting relationship with each having a wall sloping inwardly into said combustion chamber to thereby increase the area of the wall surfaces exposed for heating and to improve the combustion of the gases rising from said burners, said flow and return pipes being connected to separate circulation channels, a plurality of heating fins fixed in the upper region of said ascending shaft, a heating air jacket surrounding said heating water jacket and having an exit opening, a chimney jacket connected to said heating air jacket and surrounding said exhaust gas chimney, an atmospheric room air inlet, means for forcing said room air through said chimney jacket and heating air jacket to thereby become heated by heat exchange, and flowing said heated air through said exit opening into said room.

2. A heater for a water heating installation as claimed in claim 1 wherein said heating water jacket is provided with an upper circulation channel which is connected to said flow pipe and a vertically aligned lower circulation channel which is connected to said return pipe, and said heating fins fixed in the upper region of said ascending shaft engaging the inner walls of said upper circulation channel.

3. A heater for a water heating installation as claimed in claim 1 wherein said heating fins extend over the entire cross sectional area of said ascending shaft.

4. A heater for a water heating installation as claimed in claim 1 wherein at least some of said heating fins are cut out and are decreased in area in the lower region thereof to thereby prevent the water in said water heating jacket from being excessively heated.

* * * * *

UNITED STATES PATENT AND TRADEMARK OFFICE
CERTIFICATE OF CORRECTION

PATENT NO. : 4,662,350

DATED : May 5, 1987

INVENTOR(S) : WILHELM MOSSBACH

It is certified that error appears in the above-identified patent and that said Letters Patent is hereby corrected as shown below:

In the Title Page please insert:

[73]   Assignee:   Dometic Sales Corporation
                   Elkhart, Indiana 46515

Signed and Sealed this

Third Day of November, 1987

*Attest:*

DONALD J. QUIGG

*Attesting Officer*   *Commissioner of Patents and Trademarks*